(12) United States Patent
Carbonelli et al.

(10) Patent No.: US 8,891,491 B2
(45) Date of Patent: *Nov. 18, 2014

(54) METHOD OF PROCESSING SIGNALS AND A SIGNAL PROCESSOR

(75) Inventors: Cecilia Carbonelli, Munich (DE); Michael Horvat, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 237 days.

This patent is subject to a terminal disclaimer.

(21) Appl. No.: 13/524,143

(22) Filed: Jun. 15, 2012

(65) Prior Publication Data

US 2013/0336133 A1 Dec. 19, 2013

(51) Int. Cl.
*H04B 7/212* (2006.01)
*H04L 25/02* (2006.01)
*H04L 27/26* (2006.01)
*H04B 3/10* (2006.01)

(52) U.S. Cl.
CPC ........ *H04L 25/0232* (2013.01); *H04L 27/2647* (2013.01)
USPC .......................................... 370/332; 370/491

(58) Field of Classification Search
None
See application file for complete search history.

(56) References Cited

U.S. PATENT DOCUMENTS

| | | | |
|---|---|---|---|
| 5,652,772 | A | 7/1997 | Isaksson et al. |
| 6,680,969 | B1 | 1/2004 | Molnar et al. |
| 8,355,473 | B2 | 1/2013 | Li et al. |
| 2002/0172307 | A1 | 11/2002 | Sandberg |
| 2007/0076804 | A1 | 4/2007 | Sestok, IV et al. |
| 2007/0242760 | A1 | 10/2007 | Hsiung et al. |
| 2010/0040154 | A1 | 2/2010 | Carbonelli et al. |
| 2010/0150013 | A1* | 6/2010 | Hara et al. ............... 370/252 |
| 2010/0290570 | A1 | 11/2010 | Sathananthan et al. |
| 2011/0019749 | A1 | 1/2011 | Wilhelmsson et al. |
| 2011/0098073 | A1 | 4/2011 | Park et al. |
| 2011/0116572 | A1* | 5/2011 | Lee et al. ................. 375/295 |
| 2011/0200073 | A1 | 8/2011 | Zalio |
| 2011/0249773 | A1* | 10/2011 | Lee ........................ 375/316 |
| 2012/0027110 | A1 | 2/2012 | Han |
| 2012/0039287 | A1* | 2/2012 | Ko et al. .................. 370/329 |
| 2012/0082274 | A1 | 4/2012 | Bury |
| 2012/0320961 | A1 | 12/2012 | Pham et al. |
| 2013/0201840 | A1* | 8/2013 | Sorrentino et al. ........... 370/252 |

OTHER PUBLICATIONS

3GPP TS 36.211. V 10.4.0. Dec. 2011. pp. 66-76.
3GPP TS 36.133. V 10.6.0. Mar. 2012. pp. 61-80.
3GPP TS 36.355. V 10.4.0. Dec. 2011. pp. 39-49.
3GPP TS 36.214. V 10.1.0. Mar. 2011. pp. 10-11.
3GPP TS 36.211 V8.9.0 (Dec. 2009). pp. 62-65.
3GPP TS 36.211 V9.1.0 (Mar. 2010). pp. 65-74.
Morelli, M; Mengali U., A comparison of pilot-aided channel estimation methods for OFDM systems., IEEE Transactions on Signal Processing, vol. 49, Issue 12, Dec. 2001, pp. 3065-3073.

(Continued)

*Primary Examiner* — Eunsook Choi
(74) *Attorney, Agent, or Firm* — Eschweiler & Associates, LLC

(57) ABSTRACT

The method includes receiving a signal in a multiple carrier mobile communication system, the signal including at least two reference symbols of different types, determining a first channel estimate at a symbol position of a first reference symbol of a first type, determining a second channel estimate at a symbol position of a second reference symbol of a second type, and determining a quantity being a function of a cross-correlation between the first and second channel estimate.

30 Claims, 9 Drawing Sheets

(56) References Cited

OTHER PUBLICATIONS

C. Tepedelenlioglu, A. Abdi, G. G. Giannakis, M. Kaveh, "Estimation of Doppler spread and signalstrength in mobile communications with applications to handoff and adaptive transmission", Wireless Communications and Mobile Computing, 2001; 1:221-242.

T. Yücek, R. M. A. Tannies, H. Arslan, "Doppler spread estimation for wireless OFDM systems", in Proceedings, 2005 IEEE Sarnoff Symposium, Apr. 2005.

3GPP TS 36.133 V9.6.0 (Dec. 2010). pp. 75-78.

3GPP TS 36.355 V9.4.0 (Dec. 2010). pp. 38-41.

3GPP TS 36.214 V9.2.0 (Jun. 2010). pp. 1-14.

Speth, M.; Fechtel, S. ; Fock, G.; Meyr, H., "Optimum receiver design for wireless broad-band systems using OFDM.I", IEEE Transactions on Communications, vol. 47, Issue 11, Nov. 1999, pp. 1668-1677.

3GPP TS 36.211 V1.3.2 (Sep. 2007): 3rd Generation Partnership Project; Technical Specification Group Radio Access Network; Evolved Universal Terrestrial Radio Access (E-UTRA); Physical Channels and Modulation. pp. 16-22.

J. Cai, W. Song, Z. Li, "Doppler estimation for mobile OFDM systems", IEEE Transactions on Consumer Electronics, vol. 49, pp. 973-977, Nov. 2003.

Hoeher, P. et al., "Pilot-Symbol-Aided Channel Estimation in Time and Frequency", in Proc. International Conference on Acoustics, Speech and Signal Proc. (ICASSP'97), vol. 3, pp. 1845-1848, Munich, Apr. 1997.

Medbo, J. et al., "Propagation Channel Impact on LTE Positioning Accuracy—A Study Based on Real Measurements of Observed Time Difference of Arrival", in Proc. PIMRC 2009, pp. 2213-2217, Sep. 2009.

Zhao, M. et al., "Iterative Turbo Channel Estimation for OFDM System over Rapid Dispersive Fading Channel", IEEE Transactions on Wireless Communications, vol. 7, No. 8, pp. 3174-3184, Aug. 2008.

Shin, C. et al., "Blind Channel Estimation for MIMO-OFDM Systems", IEEE Transactions on Vehicular Technology, vol. 56, No. 2, pp. 670-685, Mar. 2007.

U.S. Appl. No. 13/226,580, filed Sep. 7, 2011. 39 Pages.

Notice of Allowance dated Oct. 29, 2013 for U.S. Appl. No. 13/226,580. 20 Pages.

Office Action dated Jun. 20, 2013 for U.S Appl. No. 13/226,580.

* cited by examiner

METHOD OF PROCESSING SIGNALS AND A SIGNAL PROCESSOR

FIELD

The present invention relates to a method of processing signals in a multiple carrier mobile communication system.

BACKGROUND

Wireless radio transmission systems can be configured on the basis of transmitters and receivers capable of transmitting and receiving multiple carrier data signals. One example of a multiple carrier radio transmission system is Orthogonal Frequency Division Multiplexing (OFDM) in which an OFDM transmitter broadcasts information consisting of symbols containing a plurality of equally spaced carrier frequencies. The characteristics of the wireless communication channel typically vary over time due to changes in the transmission path. For demodulating OFDM modulated data in the presence of substantial time variations of the transmission channel, knowledge of the transmission channel frequency response is required. This necessitates that the receiver provides an appropriate channel estimate of the transmission channel.

In order to facilitate channel estimation, known cell-specific reference symbols (CRS), called pilots, can be inserted at specific locations in the time-frequency grid of the OFDM signal. In addition to cell-specific reference signals, other reference signals like positioning reference signals (PRS), user equipment (UE) specific reference signals, or Multicast Broadcast Single Frequency Network (MBSFN) reference signals can be transmitted. These different types of reference signals can be transmitted by different physical antennas or they can be transmitted, at least in part, by the same antennas. More specifically, the reference signals correspond to logical antennas ports and the number of logical antenna ports can be higher than the number of physical antennas so that one physical antenna may transmit two or more reference signals of different types.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

DETAILED DESCRIPTION

Figure 1:
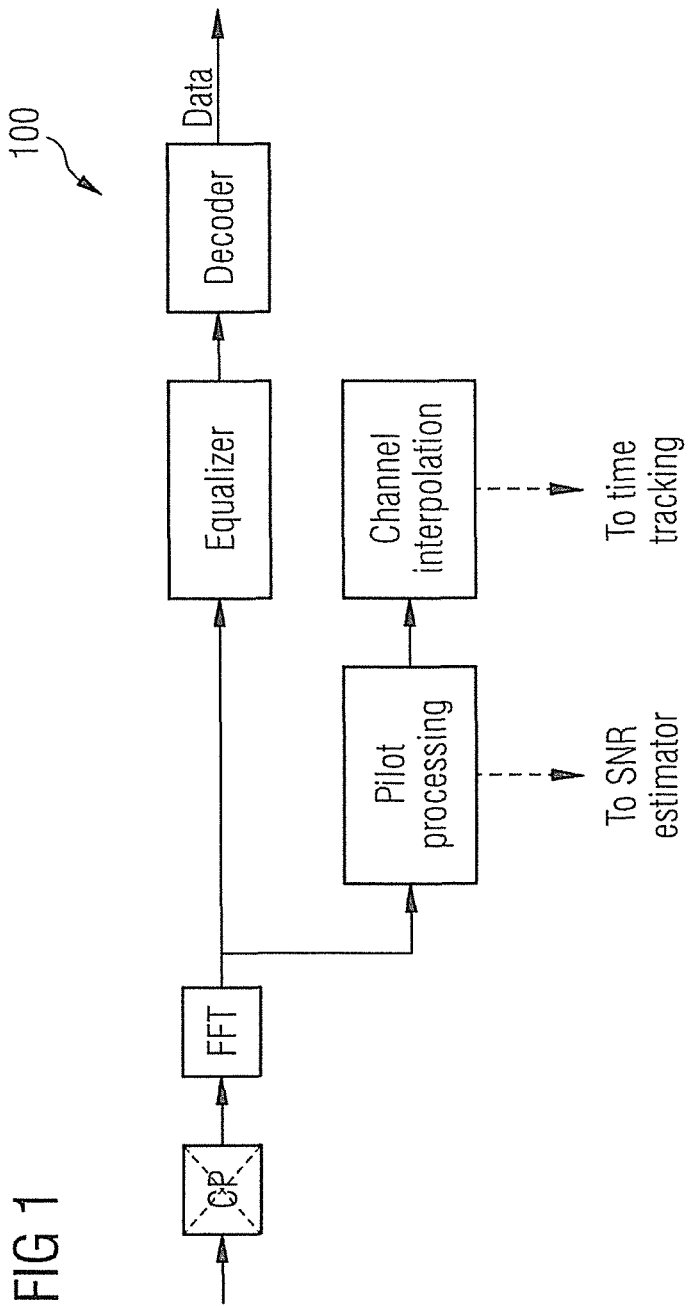
FIG. 1 shows a schematic block representation of a receiver for a multiple carrier mobile communication system.

The aspects and embodiments are described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The apparatuses and methods as described herein are utilized as part of and for radio transmission systems, namely for systems operating in the Orthogonal Frequency Division Multiplex (OFDM) mode. The apparatuses disclosed may be embodied in baseband segments of devices used for the transmission or reception of OFDM radio signals, in particular base stations, relay stations, mobile phones, hand-held devices or other kinds of mobile radio receivers. The described apparatuses may be employed to perform methods as disclosed herein, although those methods may be performed in any other way as well.

The following description may be read in connection with any kind of multiple carrier radio transmission systems, in particular any mobile communications systems employing multiple carrier modulation, such as, for example, the Universal Mobile Telecommunications System (UMTS) Standard or the Long Term Evolution (LTE) Standard.

The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite OFDM systems, may benefit from the concepts and principles outlined herein.

The methods and apparatuses as described herein may be utilized with any sort of antenna configurations employed within the multiple carrier radio transmission system as described herein. In particular, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

Referring to FIG. 1, there is shown a schematic block representation of a receiver which may demodulate and decode OFDM multi-carrier transmission signals. The receiver 100 may include a baseband processor for carrying out the different functions as shown in FIG. 1. The baseband processor removes the cyclic prefix (CP), transforms the signal into the frequency domain using a Fast Fourier Transform (FFT) and performs channel estimation, equalization, and turbo channel decoding. We consider an OFDM system with N sub-carriers and L OFDM symbols per slot. Assuming perfect synchronization, the complex baseband representation of the received signal $y_{k,l}$ for sub-carrier k and OFDM symbol l reduces to:

$$y_{k,l}=x_{k,l}H_{k,l}+z_{k,l}, k=1,\ldots,N\ l=1,\ldots,L \quad (1)$$

where $x_{k,l}$, $H_{k,l}$ and $z_{k,l}$ denote the transmitted symbol with energy per symbol $E_s$, the channel transfer function sample and the additive white Gaussian noise with zero mean and variance $N_0$, respectively.

Figure 2:
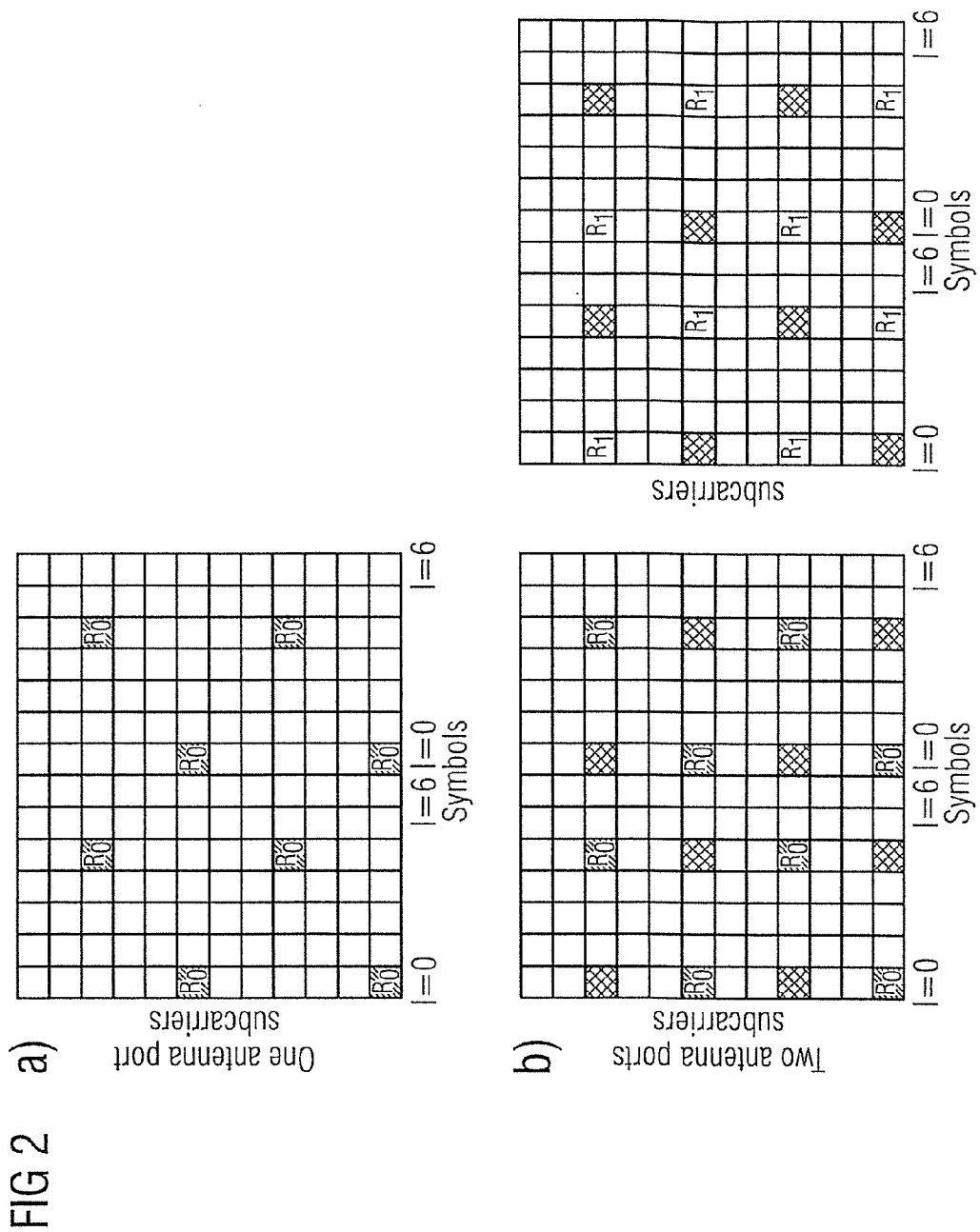
FIGS. 2a-2c show symbol-carrier matrices containing cell-specific reference signals in a one transmission antenna port configuration (FIG. 2a) and in a two transmission antenna port configuration (FIG. 2b) and a symbol carrier matrix containing positioning down-link reference signals (FIG. 2c), respectively.
Figure 2:
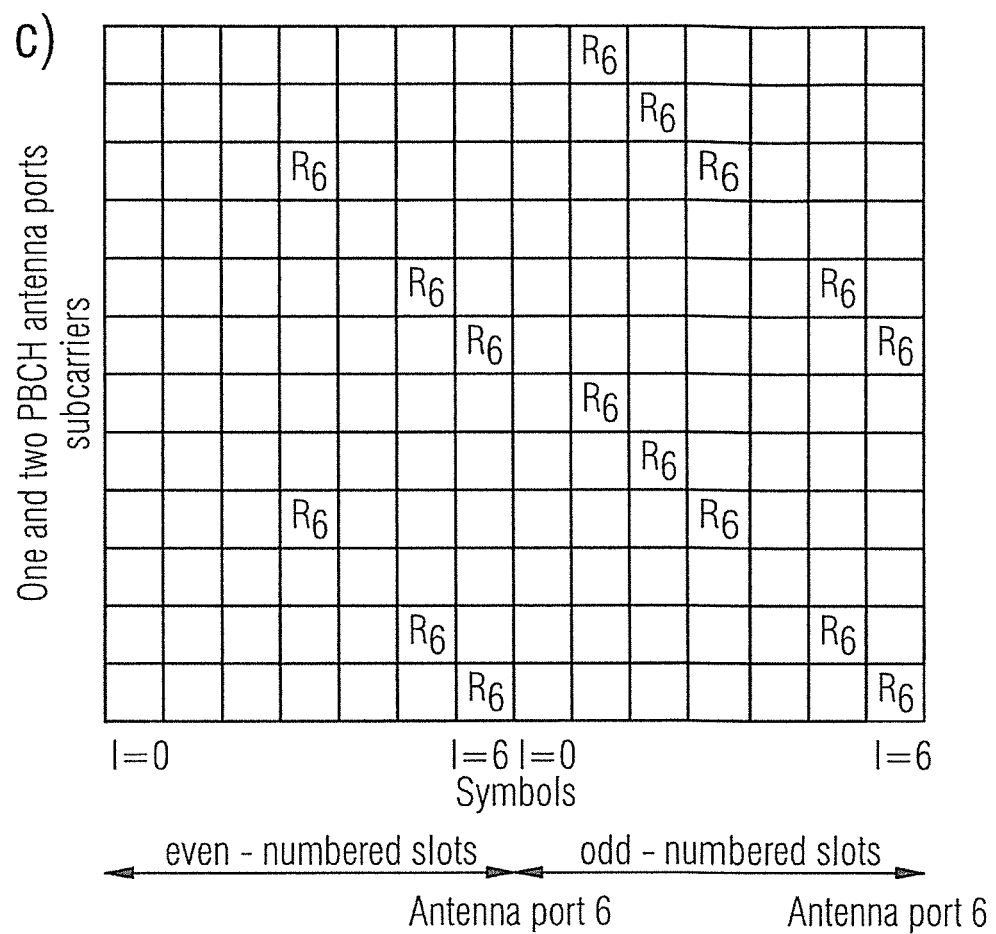

Referring to FIGS. 2a-2c, there are shown symbol-carrier matrices each containing specific reference symbols at predetermined positions of the symbol-carrier matrix, respectively. FIGS. 2a and 2b show the transmission of cell-specific reference symbols (CSRS) or so-called pilots, designated as $R_0$ and $R_1$, in a one transmission antenna configuration (FIG. 2a) and a two transmission antenna configuration (FIG. 2b). FIG. 2c shows the transmission of positioning reference symbols (PRS), designated as $R_6$.

In many OFDM systems, in order to facilitate channel estimation, known symbols, namely the above-mentioned CSRS symbols or pilots, are inserted at specific locations in the time-frequency grid or symbol-carrier matrix. The two-dimensional pilot pattern for the LTE case is shown in FIGS. 2a and 2b. It is seen that the pilot spacing in the frequency direction equals six OFDM symbols, while in the time direction there are two OFDM symbols per slot (referred to as reference symbols) containing pilots, at a distance of 4 and 3 OFDM symbols from one another. Channel estimates can be first obtained at the pilot positions using simple least squares (LS) demodulation, which for PSK pilot modulation reduces to $$\hat{H}_{n,l}=y_{n,l}x^*_{n,l},\ \{n,l\}\in P \quad (2)$$

where P is the set of all pilot locations. The remaining channel coefficients are then calculated using interpolation techniques in both the time and frequency directions.

In LTE, in addition to cell specific reference signals (CSRS), a further reference signal type, namely positioning reference signals (PRS), is introduced, which enables the user equipment (UE) to measure the reference signal time difference (RSTD) between different cells. PRS as well as CSRS are cell-specific and only require the Cell-ID for detection. The corresponding time-frequency grid is shown in FIG. 2c. The UE uses the PRS to measure the RSTD between the subframes from different base stations (eNB, evolved node B), which is defined as: $T_{SubframeRxj}-T_{SubframeRxi}$. The RSTD of at least 2 eNB pairs are required by the serving eNB to resolve the position of the reporting UE. The details of the positioning method are of no relevance here and will not be discussed in more detail. In the following it will be shown that PRS symbols as well as CSRS symbols can be utilized for channel estimation, Doppler spread estimation and positioning and the way of utilizing them depends on whether reference signals of different types were transmitted by one and the same physical antenna or not.

Figure 3:
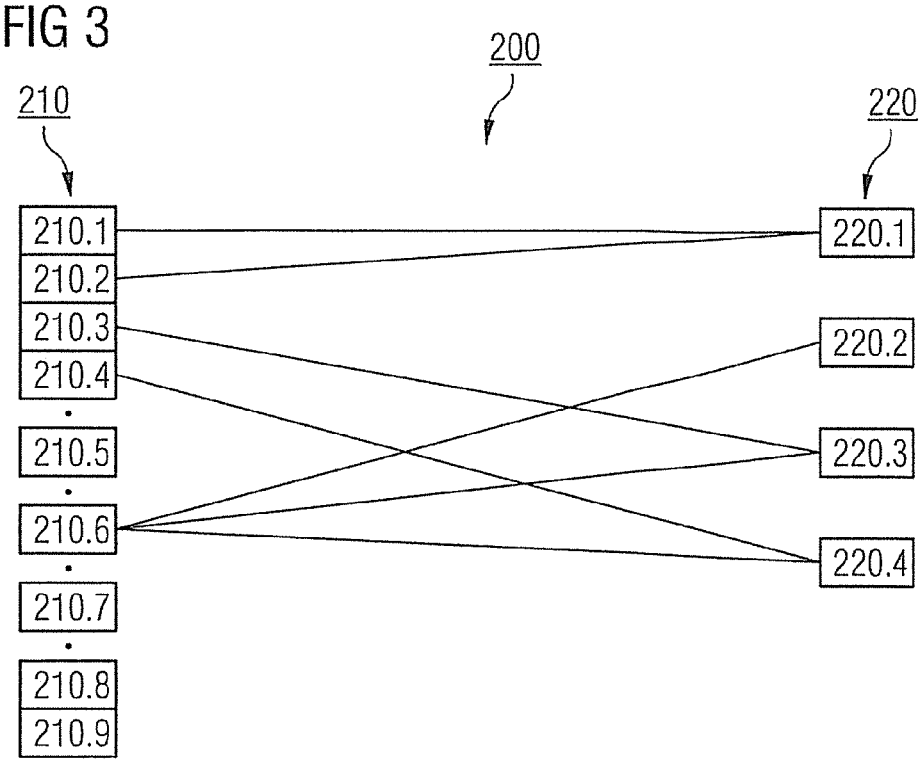
FIG. 3 shows a schematic representation of a mapping between logical antenna ports and physical antennas according to the disclosure.

Referring to FIG. 3, there is shown a schematic representation of an exemplary mapping from logical antenna ports to physical antennas as it may be implemented in a base station. The mapping 200 as illustrated in FIG. 3 is configured in such a way that logical antenna ports 210 are mapped to physical antennas 220. The antenna ports 210 correspond to different types of reference signals. The first antenna port 210.1 is, for example, reserved for cell-specific reference symbols (CRS) or so-called pilots, which are used to facilitate the channel estimation. The second antenna port 210.2 may be reserved for positioning reference signals (PRS) which may enable the mobile station (UE) to measure the reference signal time difference (RSTD) between different cells. The third antenna port 210.3 may be reserved for UE specific reference signals like, for example, DM-RS signals which support single layer beam-forming. The fourth antenna port 210.4 may be reserved for Multicast Broadcast Single Frequency Network (MBSFN) signals. There may be further logical antenna ports which may be reserved to further types of reference signals. On the other hand, a situation such as that shown in FIG. 3 may be given in which the base station may have physical antennas, the number of which may be less than the number of the logical antenna ports 210. In the illustrative example of FIG. 3 the base station comprises 4 physical antennas 220.1 to 220.4. The way the logical antenna ports 210 are mapped to the physical antennas 220 lies completely in the responsibility of the base station. Therefore, the situation may occur that two or even more logical antenna ports 210 are mapped to one and the same physical antenna 220 which means that reference signals of two or more different types are transmitted by one and the same physical antenna 220. Moreover, there is no requirement for the base station to inform the UE about the mapping 200. The mapping of reference signals of two or more different types to one physical antenna may be named as "antenna port re-use". In the example shown in FIG. 3 both CRS and PRS symbols of logical antenna ports are mapped to the physical antenna 220.1. Such a constellation will be of particular significance in the following.

Figure 4:
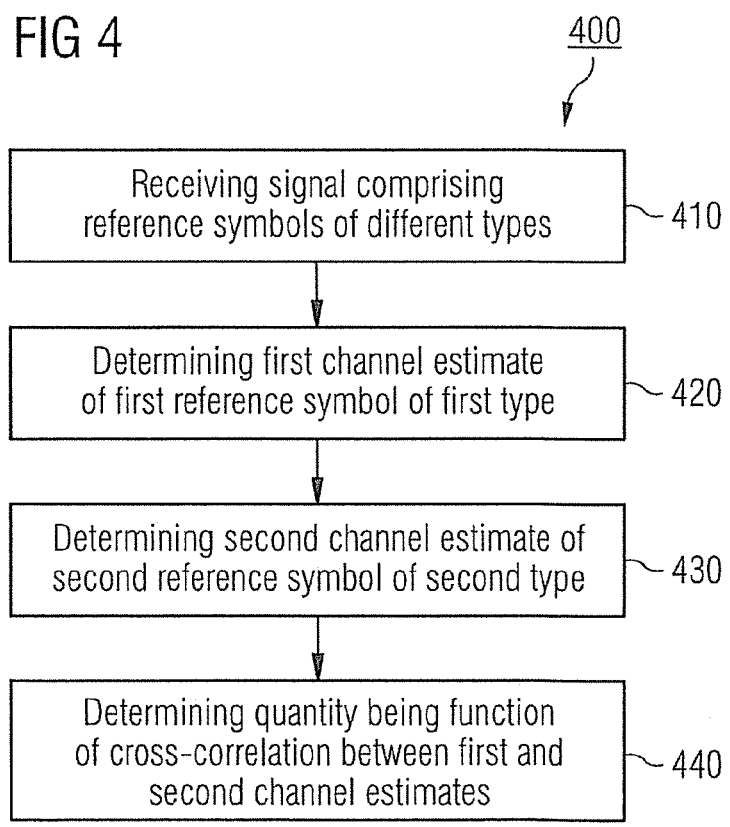
FIG. 4 shows a flow diagram of a method of processing signals in a multiple carrier mobile communication system according to the disclosure.

Referring to FIG. 4, there is shown a flow diagram for illustrating a method of processing signals in a multiple carrier mobile communication system according to the disclosure. The method 400 of FIG. 4 comprises receiving a signal in a multiple carrier mobile communication system, the signal comprising at least two reference symbols of different types at 410, determining a first channel estimate at a symbol position of a first reference symbol of a first type at 420, determining a second channel estimate at a symbol position of a second reference symbol of a second type at 430, and determining a quantity being a function of a cross-correlation between the first and second channel estimates at 440.

In other words, the method 400 as described so far may be able to determine whether antenna port re-use has been applied in the transmitting station when transmitting the signal. The cross-correlation between the first and second channel estimates can be utilized as an indicator of whether the first and second reference symbols have been transmitted by one and the same physical antenna of the transmitting station. As will be shown in some more detail below, an appropriate function of the cross-correlation can be defined and one or more appropriate threshold levels can be determined which can be utilized for deciding whether the received signal has been generated by antenna port re-use.

According to an embodiment of the method 400 of FIG. 4, the first reference symbol is comprised of a cell-specific reference symbol.

According to an embodiment of the method 400 of FIG. 4, the second reference symbol is comprised of a positioning reference symbol.

According to an embodiment of the method 400 of FIG. 4, the first and second reference symbols are transmitted on one and the same carrier.

According to an embodiment of the method 400 of FIG. 4, the first and second reference symbols may be positioned on two consecutive symbol positions and, in particular on one and the same carrier. According to an embodiment thereof, the method 400 may further comprise determining a quantity $$\Psi = \frac{E\{\tilde{H}_{n_P}^{n_{RB}}(1)\tilde{H}_{n_C}^{n_{RB}}(1+1)^*\}}{E\{\tilde{H}_{n_C}^{n_{RB}}(1)\tilde{H}_{n_C}^{n_{RB}}(1)^*\} - \hat{\sigma}^2} \quad (3)$$

wherein $E\{\ \}$ denotes calculation of an expectation value, $\tilde{H}_{n_P}^{n_{RB}}, \tilde{H}_{n_C}^{n_{RB}}$ are the first and second channel estimates, $\hat{\sigma}^2$ is an estimated noise variance, l is the symbol, and * means the complex conjugate.

According to an embodiment of the method 400 of FIG. 4, the method 400 further comprises detecting whether the determined quantity lies above or below at least a first predetermined threshold value. Accordingly, a decision can be made whether it can be assumed that the received signal is influenced by antenna port re-use or not. The further processing of the received signal with respect to channel estimation and Doppler spread estimation can be made dependent on this decision.

According to an embodiment of the method 400 of FIG. 4, further channel estimates on further symbol positions can be determined in the following way. If the determined quantity lies below the first predetermined threshold value, only reference symbols of the first type, in particular cell-specific reference symbols, may be utilized for channel estimation, and if the determined quantity lies above the first predetermined threshold value, both reference symbols of the first type, in particular cell-specific reference symbols, and reference symbols of the second type, in particular positioning reference symbols, may be utilized. Moreover, the last-mentioned case of joint-using first and second reference symbols can be further differentiated. In particular a second predetermined threshold value can be introduced, which can be higher than the first predetermined threshold value, and a determination can be made whether the determined quantity lies below or above the second predetermined threshold value. If it lies below the second predetermined threshold value, the reference symbols of the first type and of the second type can be used for interpolation along time and frequency directions in a symbol-carrier matrix of the received signal for channel estimation purposes. On the other hand, if the determined quantity lies above the second predetermined threshold value, adjacent reference symbols of first and second types can also be averaged before interpolation.

According to an embodiment of the method 400 of FIG. 4, a Doppler spread can be determined and the way of determining it can be made dependent on whether the determined quantity lies above or below the first predetermined threshold value. When a user or reflector in its environment is moving, the user's velocity causes a shift in the frequency of the signal transmitted along each signal path. This phenomenon is called the Doppler shift. Signals travelling along different paths can have different Doppler shifts, corresponding to different rates of change in phase. The difference in Doppler shifts between different signal components contributing to a single fading channel tap is known as the Doppler spread. Doppler spread estimation is crucial to channel estimation and to any other block in the system which requires an indication of the speed of the mobile, e.g. whether it is static or not, to perform some specific signal processing.

According to an embodiment of the method 400 of FIG. 4, for determining the Doppler spread, only reference symbols of the first type, in particular cell-specific reference symbols, or of the second type, in particular positioning reference symbols, are used if the determined quantity lies below the first predetermined threshold value, and both reference symbols of the first type, in particular cell-specific reference symbols, and reference symbols of the second type, in particular positioning reference symbols are used, if the determined quantity lies above the first predetermined threshold value. Jointly using reference symbols of both types means, for example, using these reference symbols of both types to compute time auto-correlation functions, in particular including calculating cross-correlations between these reference symbols or their channel estimates.

According to an embodiment of the method 400 of FIG. 4, the Doppler spread can be determined based on the determined quantity if the determined quantity lies above the first predetermined threshold value. In particular, the Doppler spread can be determined based on the determined quantity as defined in above equation (3).

According to an embodiment of the method 400 of FIG. 4, one or more of the first and second channel estimates are obtained by least square estimation.

Figure 5:
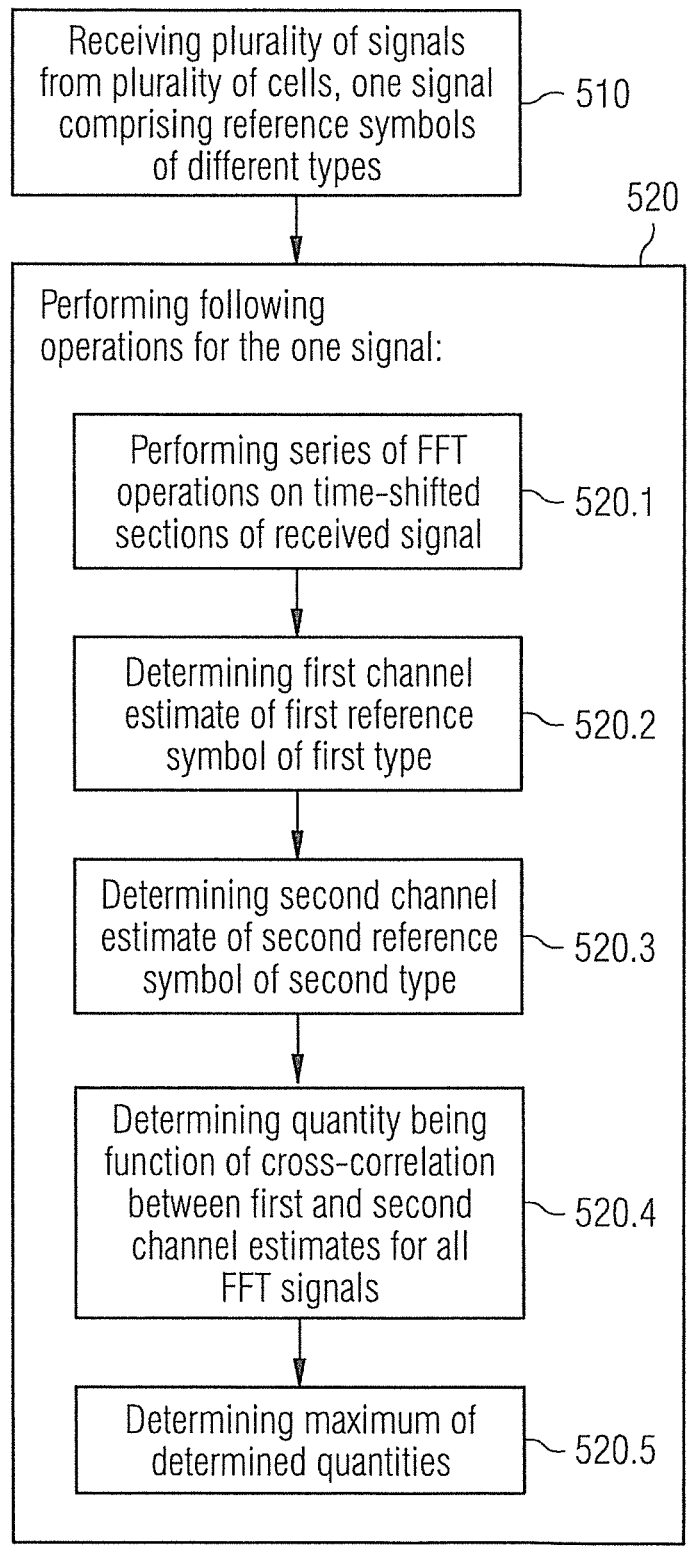
FIG. 5 shows a flow diagram of a method of processing signals in a multiple carrier mobile communication system according to the disclosure.

Referring to FIG. 5, there is shown a flow diagram for illustrating a method of processing signals in a multiple carrier mobile communication system according to the disclosure. The method 500 of FIG. 5 comprises receiving a plurality of signals from a plurality of cells in a multiple carrier communication system, at least one signal of the plurality of signals comprising at least two reference symbols of different types at 510, and performing the following operations for the at least one signal: performing a series of Fast Fourier Transform (FFT) operations on time-shifted sections of the received signal to obtain a series of Fourier transformed signals at 520.1, determining a first channel estimate at a symbol position of a first reference symbol of a first type of each one of the Fourier transformed signals at 520.2, determining a second channel estimate at a symbol position of a second reference symbol of a second type of each one of the Fourier transformed signals at 520.3, determining a quantity being a function of a cross-correlation between the first and second channel estimates of each one of the Fourier transformed signals at 520.4, and determining a maximum of the determined quantities at 520.5.

According to an embodiment of the method 500 of FIG. 5, the first reference symbol can be comprised of a cell-specific reference symbol.

According to an embodiment of the method 500 of FIG. 5, the second reference symbol can be comprised of a positioning reference symbol.

Figure 6:
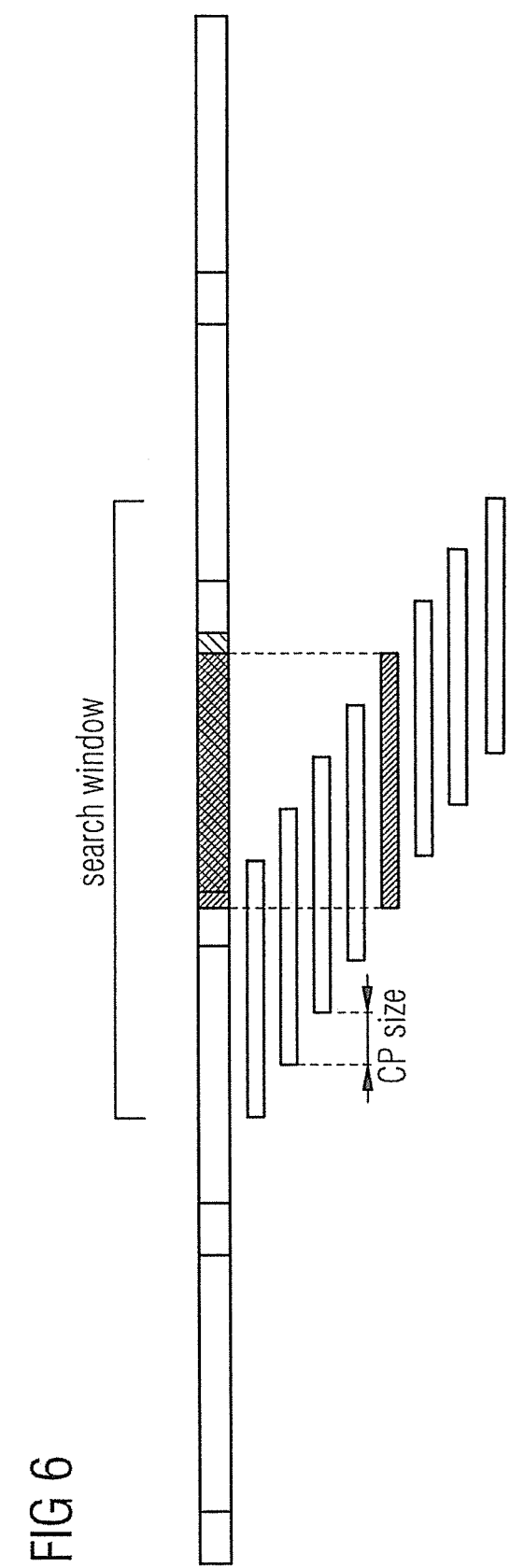
FIG. 6 shows a schematic representation for illustrating a sliding Fast Fourier Transform (FFT) process according to the disclosure.

Referring to FIG. 6, there is shown a schematic representation for illustrating the step of performing a series of Fast Fourier Transform (FFT) operations on time-shifted sections of the received signal which may be visualized as a sliding Fast Fourier Transform (FFT) operation. In general, for performing a positioning operation, the receiver uses the reference signals transmitted from multiple cells to determine the Reference Signal Time Difference (RSTD) between each positioning neighbor cell and the positioning reference cell. An example of a positioning method based on the RSTD measurements is the offset time-difference of arrival (OT-DOA) method. The cells are not time synchronized with each other, thus measuring the RSTD boils down to a time synchronization problem, where the first step comprises detecting the correct OFDM symbol timing (coarse timing). One may assume that the receiver is already time synchronized with a particular base station to which it is allocated, also called the serving eNB, and with which a standing communication exists, but there is no time synchronization with the other cells. FIG. 6 shows schematically the received signal of one of these other cells. Within a search window of the considered cell, the receiver performs a sliding FFT wherein at each step an FFT is carried out, the sequence is demodulated and a correlation function is calculated between the known pilot sample sequence and a section of the received signal.

According to an embodiment of the method 500 of FIG. 5, the first and second reference symbols may be positioned on two consecutive symbol positions on one and the same carrier. In particular, the method 500 may further comprise determining a quantity $$\Psi(\tilde{\theta}) = \frac{E\{\tilde{H}_{n_P}^{n_{RB}}(l)\tilde{H}_{n_C}^{n_{RB}}(l+1)^*\}}{E\{\tilde{H}_{n_C}^{n_{RB}}(l)\tilde{H}_{n_C}^{n_{RB}}(l)\} - \hat{\sigma}^2} \quad (4)$$

wherein $\tilde{\theta}$ is also called "timing hypothesis" or "hypothesis" and corresponds to one particular time-shifted section, $E\{\}$ denotes calculation of an expectation value, $\tilde{H}_{n_P}^{n_{RB}}$, $\tilde{H}_{n_C}^{n_{RB}}$ are the first and second channel estimates, $\hat{\sigma}^2$ is an estimated noise variance, l is the symbol, and * means the complex conjugate.

According to an embodiment of the method 500 of FIG. 5, the method further comprises detecting whether the determined maximum of the determined quantities at the time-shifted sections lies above or below a predetermined threshold value. If the maximum lies below the predetermined threshold value, a quantity $$\Theta_1(\tilde{\theta}) = \sum_{n_{RB}} \left( \sum_{n_P} \tilde{H}_{n_P}^{n_{RB}}(l)\tilde{H}_{n_P}^{n_{RB}}(l+7)^* + \sum_{n_C} \tilde{H}_{n_C}^{n_{Rb}}(l+1)\tilde{H}_{n_C}^{n_{RB}}(l+1+7)^* \right) \quad (5)$$

is determined, wherein the outer sum denotes a summation over all symbols of one resource block (RB), and if the maximum lies above the predetermined threshold value, a quantity $$\Theta_2(\tilde{\theta}) = \sum_{n_{RB}} \left( \sum_{n_P/n_C} (\tilde{H}_{n_P}^{n_{RB}}(l) + \tilde{H}_{n_C}^{n_{RB}}(l+1))(\tilde{H}_{n_P}^{n_{RB}}(l+7) + \tilde{H}_{n_C}^{n_{RB}}(l+1+7))^* \right) \quad (6)$$

is determined. It is also possible that both quantities of equations (5) and (6) are determined but only one is selected for further processing. In any case one of the quantities of equations (5) and (6) is taken as a basis for determining a symbol timing between the receiver and the respective base station which transmitted the signal. After determining the symbol timing, a positioning operation can be performed by determining the reference signal time difference between each positioning neighbour cell and the positioning reference cell.

Figure 7:
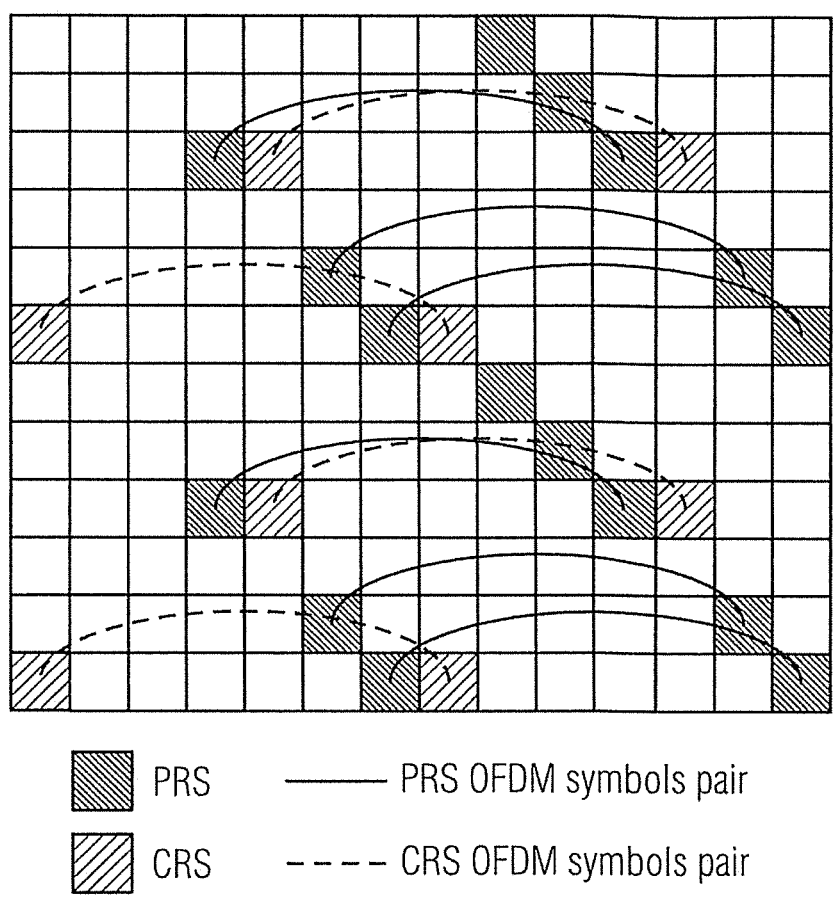
FIG. 7 shows a symbol-carrier matrix for illustrating the determination of a specific quantity according to the disclosure.
Figure 8:
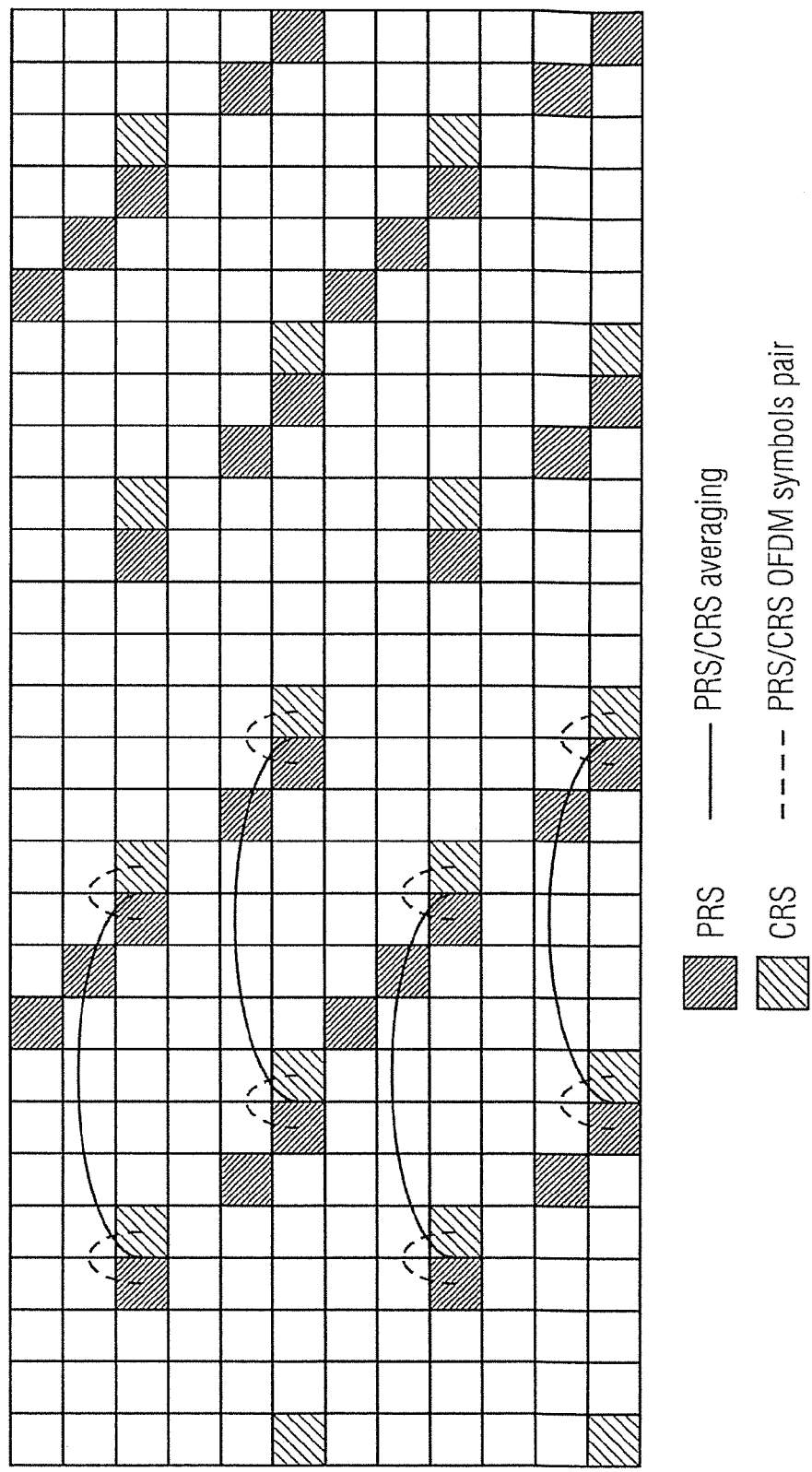
FIG. 8 shows a symbol-carrier matrix for illustrating the determination of a specific quantity according to the disclosure.

Referring to FIGS. 7 and 8, there are shown symbol-carrier matrices for illustrating the computation of the quantities of the above equations (5) and (6).

In particular, with the above equations (5) and (6) two different quantities or metrics are determined. The first one computes the cross-correlations above separately on the PRS and CRS (FIG. 7) and combines them. In the equation (5) $\tilde{\theta}$ is the tentative value for the FFT window position and $\tilde{H}_{n_P}^{n_{RB}}(l)$ and $\tilde{H}_{n_P}^{n_{RB}}(l+7)$ are the vectors of all PRS pilots collected after the sliding FFT and demodulation step for a given hypothesis on the sliding window position and at OFDM symbol l and l+7. Similarly, $\tilde{H}_{n_C}^{n_{RB}}(l+1)$ and $\tilde{H}_{n_C}^{n_{RB}}(l+1+7)$ are the vectors of all CRS pilots collected after the sliding FFT and demodulation step for a given hypothesis on the sliding window position and at OFDM symbol l+1 and l+1+7.

The second quantity of equation (6) sums the adjacent PRS/CRS pilots (same subcarriers, but adjacent symbols) and then performs the cross-correlations (FIG. 8). In equation (6) PRS and CRS pilots can be averaged prior to performing the scalar product and the second summation can be carried out over the number of adjacent PRS/CRS pairs available.

To detect the presence of port re-use, the quantity or metric as of equation (4) is calculated. In case of port re-use, the quantity of equation (4) may also provide a measurement of the Doppler bandwidth since $E\{\tilde{H}_{n_P}^{n_{RB}}(l)\tilde{H}_{n_C}^{n_{RB}}(l+1)^*\}$ very well approximates the channel time auto-correlation function at lag=1 Ts (1 OFDM symbol). In case of a static channel the ratio in (4) should be approximately 1, in case of a time varying channel, the ratio will be smaller than one, due to the smaller numerator and also due to the ICI power contribution to $E\{\tilde{H}_{n_P}^{n_{RB}}(l)\tilde{H}_{n_C}^{n_{RB}}(l)\}$ (this ICI power contribution is not present in the numerator because the ICI term is typically uncorrelated between 2 different OFDM symbols).

Keeping the 3 metrics above in mind, in the following an example of the algorithm steps is described in more detail:

1) Find the Nmax peaks of $\Theta_1(\tilde{\theta})$ in (5) and corresponding timing hypothesis for the sliding window $\hat{\theta}^{(1)} = [\hat{\theta}_1^{(1)} \hat{\theta}_2^{(1)} \ldots \hat{\theta}_{N_{max}}^{(1)}]$.
2) For each timing hypothesis in $\hat{\theta}^{(1)} = [\hat{\theta}_1^{(1)} \hat{\theta}_2^{(1)} \ldots \hat{\theta}_{N_{max}}^{(1)}]$, compute the corresponding metric $$\Psi(\hat{\theta}) = [\Psi_1(\hat{\theta}_1^{(1)}) \Psi_1(\hat{\theta}_2^{(1)}) \ldots \Psi_1(\hat{\theta}_{N_{max}}^{(1)})] \quad (4)$$

a. If $\max\{\Psi_1(\hat{\theta}_n^{(1)})\}_{n=1, 2, \ldots, N_{max}} > T_1$, port re-use is applied and the channel is static. In this case the following changes to the conventional approach apply:
      i. Positioning: use metric (6) to find timing estimate
      ii. Channel estimation: average adjacent PRS/CRS pilots prior to time and frequency interpolation iii. Doppler estimation: use PRS and CRS to compute time auto-correlation function (including cross CRS/PRS products).
b. If $T_2 < \max\{\Psi_1(\hat{\theta}_n^{(1)})\}_{n=1, 2, \ldots, N_{max}} < T_1$, port re-use is applied and Doppler bandwidth is $< B_{max}$. In this case the following changes to the conventional approach apply:
  i. Positioning: use metric (5) to find timing estimate
  ii. Channel estimation: use PRS and CRS for time and frequency interpolation (with appropriate filter)
  iii. Doppler estimation: use PRS and CRS to compute time autocorrelation function (including cross CRS/PRS products).
c. If $\max\{\Psi_1(\hat{\theta}_n^{(1)})\}_{n=1, 2, \ldots, N_{max}} < T_2$, no port re-use is applied. In this case the following changes to the conventional approach apply:
  i. Positioning: use metric (5) to find timing estimate
  ii. Channel estimation: use CRS symbols
  iii. Doppler estimation: use CRS or PRS.

The thresholds $T_1$ and $T_2$ and the bandwidth $B_{max}$ can be computed assuming a Jakes spectrum for the time varying channel (Bessel model for the channel autocorrelation function) but should be adapted with the SNR. In fact, even if the channel is not exactly static, at low SNR, the noise averaging effect introduced by pilot averaging might still be dominant with respect to the signal distortion introduced by setting too low threshold (and thus underestimating the speed). A possible choice for medium SNR range (0 to 5 dB) would be: $T_1 = 0.95$, $T_2 = 0.9$, $B_{max} = 10$ Hz.

Figure 9:
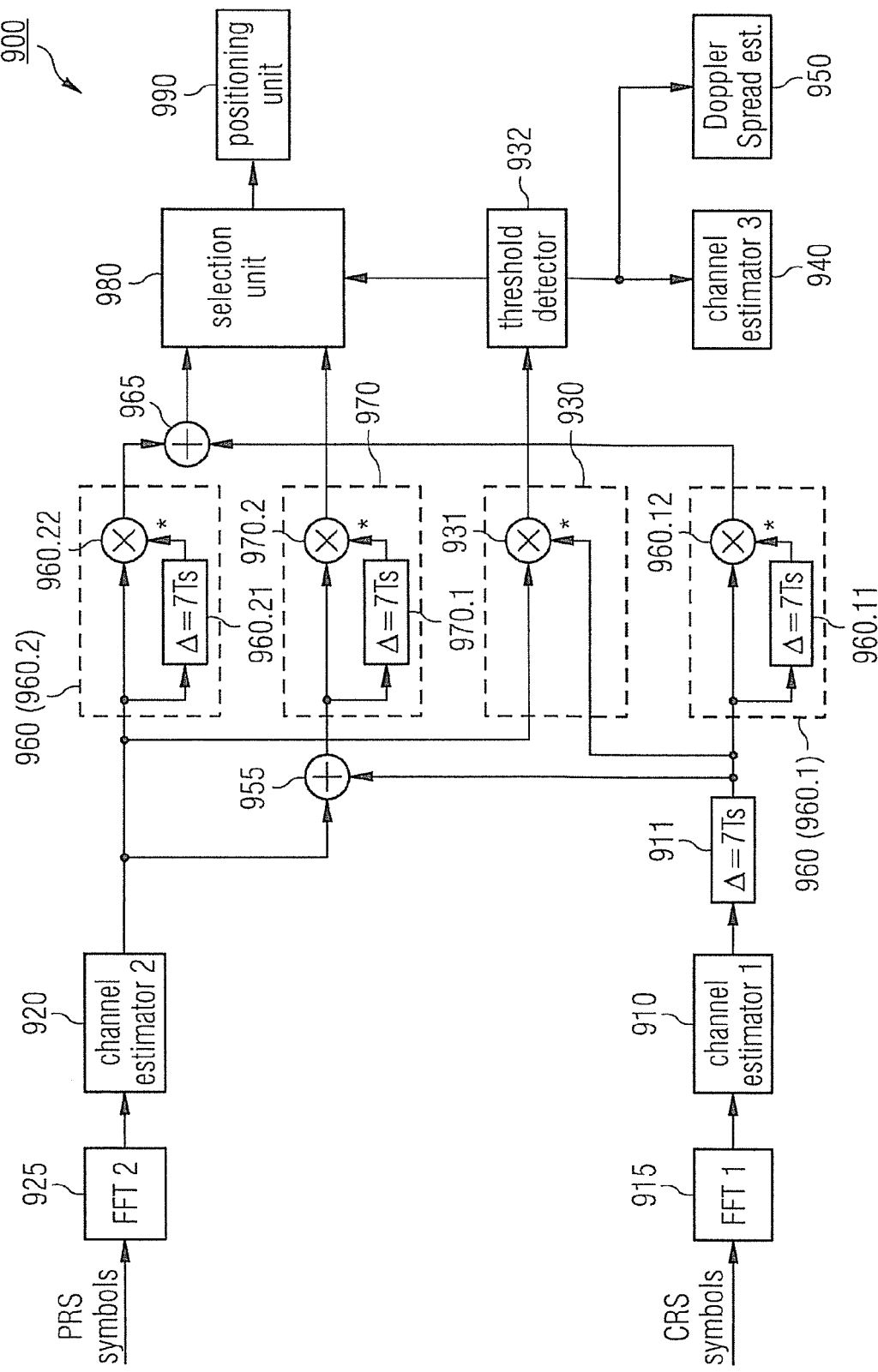
FIG. 9 shows a schematic block representation of a signal processor for processing signals in a multiple carrier mobile communication system according to the disclosure.

Referring to FIG. 9, there is shown a schematic block representation of a signal processor for processing signals in a multiple carrier mobile communication system according to the disclosure. The signal processor 900 of FIG. 9 comprises a first channel estimator 910 for determining a first channel estimate at a symbol position of a first reference symbol of a first type, a second channel estimator 920 for determining a second channel estimate at a symbol position of a second reference symbol of a second type, and a first correlation and calculation unit 930 for determining a quantity being a function of a cross-correlation between the first and second channel estimates.

According to an embodiment of the signal processor 900, the first correlation and calculation unit 930 is configured to determine a quantity according to one of the above equations (3) or (4). To this purpose, the first correlation and calculation unit 930 comprises a correlator 931 comprising a first input, a second input and an output. An output of the second channel estimator 920 is connected with the first input of the correlator 931 and an output of the first channel estimator 910 is connected with an input of a first delay element 911, an output of which is connected with the second input of the correlator 931 wherein the complex conjugate of the signal is calculated before. An output of the unit 930 can be connected with an input of a threshold detector 932 which detects whether the determined quantity lies above or below a first predetermined threshold value.

A first output of the threshold detector 932 can be connected with an input of a third channel estimator 940 for determining further channel estimates on further symbol positions. The third channel estimator can be configured such that it uses only reference symbols of the first type, in particular cell-specific reference symbols, if the determined quantity lies below the first predetermined threshold value, and to use both reference symbols of the first type, in particular cell-specific reference symbols, and reference symbols of the second type, in particular position reference symbols, if the determined quantity lies above the first predetermined threshold value.

The signal processor 900 of FIG. 9 may further comprise a Doppler spread estimation unit 950 for determining a Doppler spread, wherein an input of the Doppler spread estimation unit 950 may be coupled to the output of the threshold detector 932. The Doppler spread estimation unit 950 may be configured to use only reference symbols of the first type, in particular cell-specific reference symbols, or of the second type, in particular position reference symbols, if the determined quantity lies below the first predetermined threshold, and to use both reference symbols of the first type, in particular cell-specific reference symbols, and reference symbols of the second type, in particular position reference symbols, if the determined quantity lies above the first predetermined threshold value.

According to an embodiment of the signal processor 900 of FIG. 9, one or more of the first and second channel estimator 910 and 920 are configured to perform a least squares estimation (LSE).

According to an embodiment of the signal processor 900 of FIG. 9, the signal processor 900 may further comprise a first Fast Fourier Transformation (FFT) unit 915 to perform an FFT operation of the received signal comprising the first type reference symbols, and a second Fast Fourier Transformation (FFT) unit 925 to perform an FFT operation of the received signal comprising the second type reference signals. Both FFT units 915 and 925 may be configured to perform a series of FFT operations on time-shifted sections of the received signal. In this case the threshold detector 932 may be configured additionally as a maximum detector for determining a maximum of the quantities determined for each timing hypothesis.

According to an embodiment of the signal processor 900 of FIG. 9, it may further comprise a second correlation and calculation unit 960 and being comprised of first and second sub-units 960.1 and 960.2 and configured to determine a quantity as denoted in above equation (5). For that purpose the first sub-unit 960.1 includes a multiplier 960.12 a first input of which is connected with the output of the first channel estimator 910 and an output of which is connected with a first input of the adder 965, and a 7 Ts delay unit 960.11 an input of which is connected with the output of the first channel estimator 910 and an output of which is connected with a second input of the multiplier 960.12 for supplying a conjugate complex of the output of the delay unit 960.11 to the second input of the multiplier 960.12. Likewise the second sub-unit 960.2 includes a multiplier 960.22 a first input of which is connected with the output of the second channel estimator 920 and an output of which is connected with a second input of the adder 965, and a 7 Ts delay unit 960.21 an input of which is connected with the output of the second channel estimator 920 and an output of which is connected with a second input of the multiplier 960.22 for supplying a conjugate complex of the output of the delay unit 960.21 to the second input of the multiplier 960.22.

According to an embodiment of the signal processor 900 of FIG. 9, it may further comprise a third correlation and calculation unit 970 being configured to determine a quantity as denoted in above equation (6). The output of the 1 Ts delay unit 911 and the output of the second channel estimators 910 and 920 may be supplied to first and second inputs of an adder 955, respectively, and an output of the adder 955 is connected with an input of the third correlation and calculation unit 970. The third correlation and calculation unit 970 comprises a multiplier 970.2 a first input of which is connected with an output of the adder 955, and a 7 Ts delay unit 970.1 an input of which is connected with the output of the adder 955 and an output of which is connected with the second input of the multiplier 970.2 for inputting a conjugate complex of the output of the 7 Ts delay unit 970.1 to the multiplier 970.2.

An output of the adder 965 may be connected with a first input of a selection unit 980, and an output of the third correlation and calculation unit 970, namely of the multiplier 970.2, may be connected with a second input of the selection unit 980. An output of the threshold detector 932 may be connected with a third input of the selection unit 980. Depending on the signal received from the threshold detector 932 and supplied to the third input of the selection unit 980, the selection unit 980 selects one of the quantities $\theta_1$ or $\theta_2$ as indicated above and supplies the selected quantity to a positioning unit 990 for determining the reference signal time difference between each positioning neighbor cell and the positioning reference cell.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method of processing signals in a multiple carrier mobile communication system, comprising:
   receiving a signal in the multiple carrier mobile communication system, the signal comprising at least a first reference symbol and a second reference symbol, the first and second reference symbols being of different types and the first and second reference symbols being positioned on one and the same carrier;
   determining a first channel estimate at a symbol position of the first reference symbol of the at least two reference symbols of a first type;
   determining a second channel estimate at a symbol position of the second reference symbol of the at least two reference symbols of a second type; and
   determining a quantity being a function of a cross-correlation between the first channel estimate and the second channel estimate.

2. The method according to claim 1, wherein the first reference symbol comprises a cell-specific reference symbol.

3. The method according to claim 1, wherein the second reference symbol comprises a positioning reference symbol.

4. The method according to claim 1, wherein the first and second reference symbols are positioned on two consecutive symbol positions on one and the same carrier, the method further comprising:
   determining a quantity $$\Psi = \frac{E\{\tilde{H}_{n_P}^{n_{RB}}(1) H_{n_C}^{n_{RB}}(1+1)^*\}}{E\{H_{n_C}^{n_{RB}}(1) H_{n_C}^{n_{RB}}(1)^*\} - \sigma^2}$$

wherein $E\{\ \}$ denotes calculation of an expectation value, $\tilde{H}_{n_P}^{n_{RB}}, \tilde{H}_{n_C}^{n_{RB}}$ are the first channel estimate and the second channel estimate, respectively, $\hat{\sigma}^2$ is an estimated noise variance, and l is a symbol or slot index.

5. The method according to claim 1, further comprising:
   detecting whether the determined quantity lies above or below at least a first predetermined threshold value.

6. The method according to claim 5, further comprising:
   determining further channel estimates on further symbol positions, wherein, if the determined quantity lies below the first predetermined threshold value, only reference symbols of the first type, wherein the first type comprises cell-specific reference symbols, are used, and if the determined quantity lies above the first predetermined threshold value, both reference symbols of the first type, and reference symbols of the second type, wherein the second type comprises position reference symbols, are used.

7. The method according to claim 6, wherein,
   if the determined quantity lies above the first predetermined threshold value and below a second predetermined threshold value, using reference symbols of the first type and of the second type for interpolation along time and frequency directions in a symbol-carrier matrix of the received signal.

8. The method according to claim 7, wherein if the determined quantity lies above the first predetermined threshold value and above the second predetermined threshold value, adjacent reference symbols of the first type and the second type, respectively, are averaged before interpolation.

9. The method according to claim 5, further comprising:
   determining a Doppler spread, wherein, if the determined quantity lies below the first predetermined threshold value, only reference symbols of the first type or only reference symbols of the second type are used, and if the determined quantity lies above the first predetermined threshold value, both reference symbols of the first type and reference symbols of the second type are used.

10. The method according to claim 9, further comprising:
    determining the Doppler spread based on the determined quantity if the determined quantity lies above the first predetermined threshold value.

11. The method according to claim 1, wherein one or more of the first and second channel estimates are determined by least squares estimation.

12. A method, comprising:
    receiving a plurality of signals from a plurality of cells in a multiple carrier communication system, at least one signal comprising at least a first reference symbol and a second reference symbol, the first and second reference symbols being of different types and the first and second reference symbols being positioned on one and the same carrier;
    performing the following operations for the at least one signal:
    performing a series of Fast Fourier Transform (FFT) operations on time-shifted sections of the received signal to obtain a series of Fourier transformed signals;
    determining a first channel estimate at a symbol position of the first reference symbol of a first type of each one of the Fourier transformed signals;
    determining a second channel estimate at a symbol position of the second reference symbol of a second type of each one of the Fourier transformed signals;
    determining a quantity being a function of a cross-correlation between the first and second channel estimates of each one of the Fourier transformed signals; and
    determining a maximum of the determined quantities.

13. The method according to claim 12, wherein the first reference symbol of the first type comprises a cell-specific reference symbol.

14. The method according to claim 12, wherein the second reference symbol of the second type comprises a positioning reference symbol.

15. The method according to claim 12, wherein the first and second reference symbols are positioned on two consecutive symbol positions on one and the same carrier, the method further comprising:
determining a quantity $$\Psi(\tilde{\theta}) = \frac{E\{\tilde{H}_{n_P}^{n_{RB}}(1)\tilde{H}_{n_C}^{n_{RB}}(1+1)^*\}}{E\{\tilde{H}_{n_P}^{n_{RB}\, n_{RB}}_{\;\;n_C}(1)\tilde{H}_{n_P}^{n_{RB}\, n_{RB}}_{\;\;n_C}(1)^*\} - \hat{\sigma}^2}$$

wherein $\tilde{\theta}$ corresponds to one particular time-shifted section, $E\{\ \}$ denotes calculation of an expectation value, $\tilde{H}_{n_P}^{n_{RB}}$, $\tilde{H}_{n_C}^{n_{RB}}$ are the first channel estimate and the second channel estimate, respectively, $\hat{\sigma}^2$ is an estimated noise variance, and l is a symbol or slot index.

16. The method according to claim 12, further comprising:
detecting whether the determined maximum of the determined quantities lies above or below at least a predetermined threshold value.

17. The method according to claim 16, further comprising:
performing a positioning operation by determining a symbol timing based on the quantity $$\Theta_1(\tilde{\theta}) = \sum_{n_{RB}}\left(\sum_{n_P}\tilde{H}_{n_P}^{n_{RB}}(1)\tilde{H}_{n_P}^{n_{RB}}(1+7)^* + \sum_{n_C}\tilde{H}_{n_C}^{n_{RB}}(1+1)\tilde{H}_{n_C}^{n_{RB}}(1+1)\tilde{H}_{n_C}^{n_{RB}}(1+1+7)^*\right)$$

if the maximum lies below the predetermined threshold value, or
determining the symbol timing based on the quantity $$\Theta_2(\tilde{\theta}) = \sum_{n_{RB}}\left(\sum_{n_P/n_C}(\tilde{H}_{n_P}^{n_{RB}}(1) + \tilde{H}_{n_C}^{n_{RB}}(1+1))(\tilde{H}_{n_P}^{n_{RB}}(1+7) + \tilde{H}_{n_C}^{n_{RB}}(1+1+7))^*\right)$$

if the maximum lies above the predetermined threshold value; and
determining the reference signal time difference between each positioning neighbor cell and the positioning reference cell.

18. A signal processor for processing signals in a multiple carrier mobile communication system, comprising:
a first channel estimator configured to determine a first channel estimate at a symbol position of a first reference symbol of a first type received on a carrier;
a second channel estimator configured to determine a second channel estimate at a symbol position of a second reference symbol of a second type received on the same carrier as the first reference symbol; and
a first correlation and calculation unit configured to determine a quantity being a function of a cross-correlation between the first channel estimate and the second channel estimate.

19. The signal processor according to claim 18, wherein the first correlation and calculation unit is configured to determine a quantity $$\Psi(\tilde{\theta}) = \frac{E\{\tilde{H}_{n_P}^{n_{RB}}(1)\tilde{H}_{n_C}^{n_{RB}}(1+1)^*\}}{E\{\tilde{H}_{n_C}^{n_{RB}}(1)\tilde{H}_{n_C}^{n_{RB}}(1)^*\} - \hat{\sigma}^2}$$

wherein $E\{\ \}$ denotes calculation of an expectation value, $\tilde{H}_{n_P}^{n_{RB}}$, $\tilde{H}_{n_C}^{n_{RB}}$ are the first channel estimate and the second channel estimate, respectively, $\hat{\sigma}^2$ is an estimated noise variance, and l is a symbol or slot index.

20. The signal processor according to claim 19, further comprising:
a threshold detector configured to detect whether the determined quantity lies above or below a first pre-determined threshold value.

21. The signal processor according to claim 20, further comprising:
a third channel estimator configured to determine further channel estimates on further symbol positions,
wherein the third channel estimator is configured to use only reference symbols of the first type, wherein the first type comprises cell-specific reference symbols, if the determined quantity lies below the first predetermined threshold value, and use both reference symbols of the first type and reference symbols of the second type, wherein the second type comprises position reference symbols, if the determined quality is greater than the first predetermined threshold.

22. The signal processor according to claim 20, further comprising:
a Doppler spread estimation unit configured to determine a Doppler spread,
wherein the Doppler spread estimation unit is configured to use only reference symbols of the first type or only reference symbols of the second type if the determined quantity lies below the first predetermined threshold, and use both reference symbols of the first type and reference symbols of the second type if the determined quantity lies above the first predetermined threshold value.

23. The signal processor according to claim 18, wherein one or more of the first channel estimator and the second channel estimator are configured to perform a least squares estimation.

24. The signal processor according to claim 18, further comprising:
a Fast Fourier Transformation (FFT) unit configured to perform an FFT operation of the received signal.

25. The signal processor according to claim 24, wherein the FFT unit is configured to perform a series of FFT operations on time-shifted sections of the received signal.

26. The signal processor according to claim 25, wherein in each one of the FFT operations a quantity is determined, and the signal processor further comprises a maximum detector configured to determine a maximum of the quantities determined in each one of the FFT operations.

27. The signal processor according to claim 26, further comprising:
a threshold detector configured to determine whether the maximum lies above or below a first predetermined threshold value.

28. The signal processor according to claim 27, further comprising:

a second correlation and calculation unit being configured to determine a quantity $$\Theta_1(\tilde{\theta}) = \sum_{n_{RB}}\left(\sum_{n_P} \tilde{H}_{n_P}^{n_{RB}}(1)\tilde{H}_{n_P}^{n_{RB}}(1+7)^* + \sum_{n_C} \tilde{H}_{n_C}^{n_{RB}}(1+1)\tilde{H}_{n_C}^{n_{RB}}(1+1+7)^*\right),$$

wherein $\hat{\theta}$ corresponds to one particular time-shifted section, $\tilde{H}_{n_P}^{n_{RB}}$, $\tilde{H}_{n_C}^{n_{RB}}$ are the first channel estimate and the second channel estimate, respectively, l is a symbol or slot index, and the outer summation denote a summation over all symbols of one resource block, if the maximum lies below the first predetermined threshold value.

29. The signal processor according to claim 18, further comprising:
a third correlation and calculation unit being configured to determine a quantity $$\Theta_2(\tilde{\theta}) = \sum_{n_{RB}}\left(\sum_{n_P/n_C} (\tilde{H}_{n_P}^{n_{RB}}(1) + \tilde{H}_{n_C}^{n_{RB}}(1+1))(\tilde{H}_{n_P}^{n_{RB}}(1+7) + \tilde{H}_{n_C}^{n_{RB}}(1+1+7))^*\right),$$

wherein $\hat{\theta}$ corresponds to one particular time-shifted section, $\tilde{H}_{n_P}^{n_{RB}}$, $\tilde{H}_{n_C}^{n_{RB}}$ are the first channel estimate and the second channel estimate, respectively, l is a symbol or slot index, and the outer summation denote a summation over all symbols of one resource block, if the maximum lies above the first predetermined threshold value.

30. The signal processor according to claim 18, further comprising:
a positioning unit configured to determine the reference signal time difference between each positioning neighbor cell and the positioning reference cell.

* * * * *

UNITED STATES PATENT AND TRADEMARK OFFICE
CERTIFICATE OF CORRECTION

PATENT NO. : 8,891,491 B2
APPLICATION NO. : 13/524143
DATED : November 18, 2014
INVENTOR(S) : Carbonelli et al.

Page 1 of 1

It is certified that error appears in the above-identified patent and that said Letters Patent is hereby corrected as shown below:

In the Claims

Column 11, Claim 4, Line 6 should read:

$$\Psi = \frac{E\left\{\tilde{H}_{n_P}^{n_{RB}}(1)\, \tilde{H}_{n_C}^{n_{RB}}(1+1)\,^*\right\}}{E\left\{\tilde{H}_{n_C}^{n_{RB}}(1)\, \tilde{H}_{n_C}^{n_{RB}}(1)\,^*\right\} - \hat{\sigma}^2}$$

Column 13, Claim 15, Line 15 should read:

$$\Psi(\tilde{\theta}) = \frac{E\left\{\tilde{H}_{n_P}^{n_{RB}}(1)\, \tilde{H}_{n_C}^{n_{RB}}(1+1)\,^*\right\}}{E\left\{\tilde{H}_{n_C}^{n_{RB}}(1)\, \tilde{H}_{n_C}^{n_{RB}}(1)\,^*\right\} - \hat{\sigma}^2}$$

Column 13, Claim 17, Line 35 should read:

$$\Theta_1(\tilde{\theta}) = \sum_{n_{RB}} \left( \sum_{n_P} \tilde{H}_{n_P}^{n_{RB}}(1)\, \tilde{H}_{n_P}^{n_{RB}}(1+7)^* + \sum_{n_C} \tilde{H}_{n_C}^{n_{RB}}(1+1)\, \tilde{H}_{n_C}^{n_{RB}}(1+1+7)^* \right)$$

Signed and Sealed this
Second Day of June, 2015

Michelle K. Lee
*Director of the United States Patent and Trademark Office*